(12) United States Patent
Cormican

(10) Patent No.: US 6,354,391 B1
(45) Date of Patent: Mar. 12, 2002

(54) PROGRESSIVE RATE SUSPENSION SPRING TENSIONING DEVICE

(76) Inventor: Dale DeWayne Cormican, Rte. 1, Box 153, Mentor, MN (US) 56736

( * ) Notice: Subject to any disclaimer, the term of this patent is extended or adjusted under 35 U.S.C. 154(b) by 0 days.

(21) Appl. No.: 09/397,416

(22) Filed: Sep. 15, 1999

(51) Int. Cl.$^7$ .............................................. B62M 27/02
(52) U.S. Cl. ..................................... 180/193; 180/9.58
(58) Field of Search .................. 267/158, 48; 180/190, 180/193, 182, 9.5, 9.54, 9.56, 9.58, 192; 280/124.17, 124.175

(56) References Cited

U.S. PATENT DOCUMENTS

| | | | |
|---|---|---|---|
| 1,861,470 A | * | 6/1932 | Fisher |
| 2,337,073 A | * | 12/1943 | Townsend |
| 2,988,352 A | * | 6/1961 | Masser |
| 3,786,886 A | * | 1/1974 | Bombardier ................ 180/5 R |
| 3,879,092 A | * | 4/1975 | Rose ........................... 305/24 |
| 4,284,161 A | * | 8/1981 | Blass .......................... 180/184 |
| 4,462,480 A |  | 7/1984 | Yasui et al. .................. 180/193 |
| 5,505,521 A | * | 4/1996 | Meiller et al. ............ 297/302.1 |
| 5,533,586 A |  | 7/1996 | Thompson ................... 180/193 |
| 5,730,242 A | * | 3/1998 | Furusawa .................... 180/193 |
| 5,816,356 A | * | 10/1998 | Jansson et al. ............. 180/227 |

* cited by examiner

Primary Examiner—Avraham H. Lerner
(74) Attorney, Agent, or Firm—Michael S. Neustel

(57) ABSTRACT

A cambered surfaced tensioning block is provided that is used in conjunction with the rear suspension of a typical snowmobile when sufficient lateral force is applied. The tensioning block fits within an open ended block housing which is attached to the slide rail components of the rear suspension in a position that is just rearward of the point at which the spring arms are attached. The upper surface of the tensioning block is formed in a curve in a manner so that the radius of that curve lessens as you move rearward thus, creating a cambered surface. The cambered upper surface of the tensioning block is utilized to move the load point of the suspension spring arm closer to the point of force application as the lateral force applied to the suspension increases. Therefore, the use of the present invention provides a rear suspension spring characteristic that grows increasingly stiff as more and more lateral force is applied to it. This improves the handling of snowmobiles in rough terrain which is very desirable in high performance machines.

16 Claims, 5 Drawing Sheets

FIG 2 (PRIOR ART)
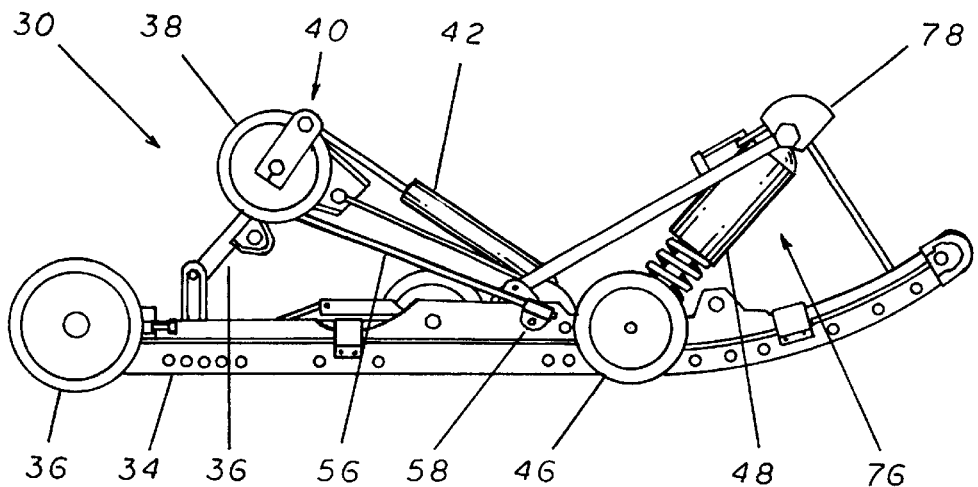
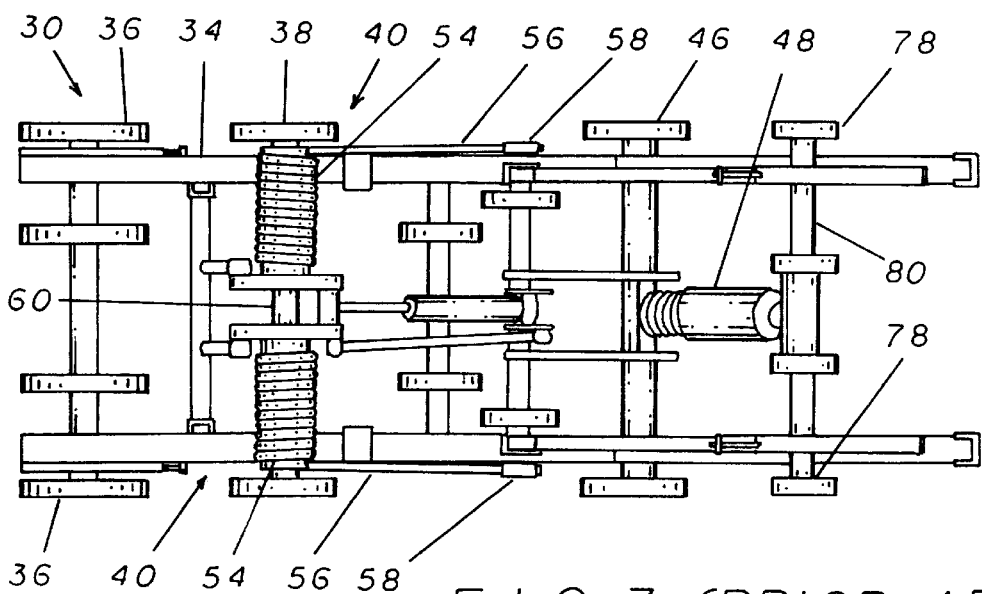
FIG 3 (PRIOR ART)

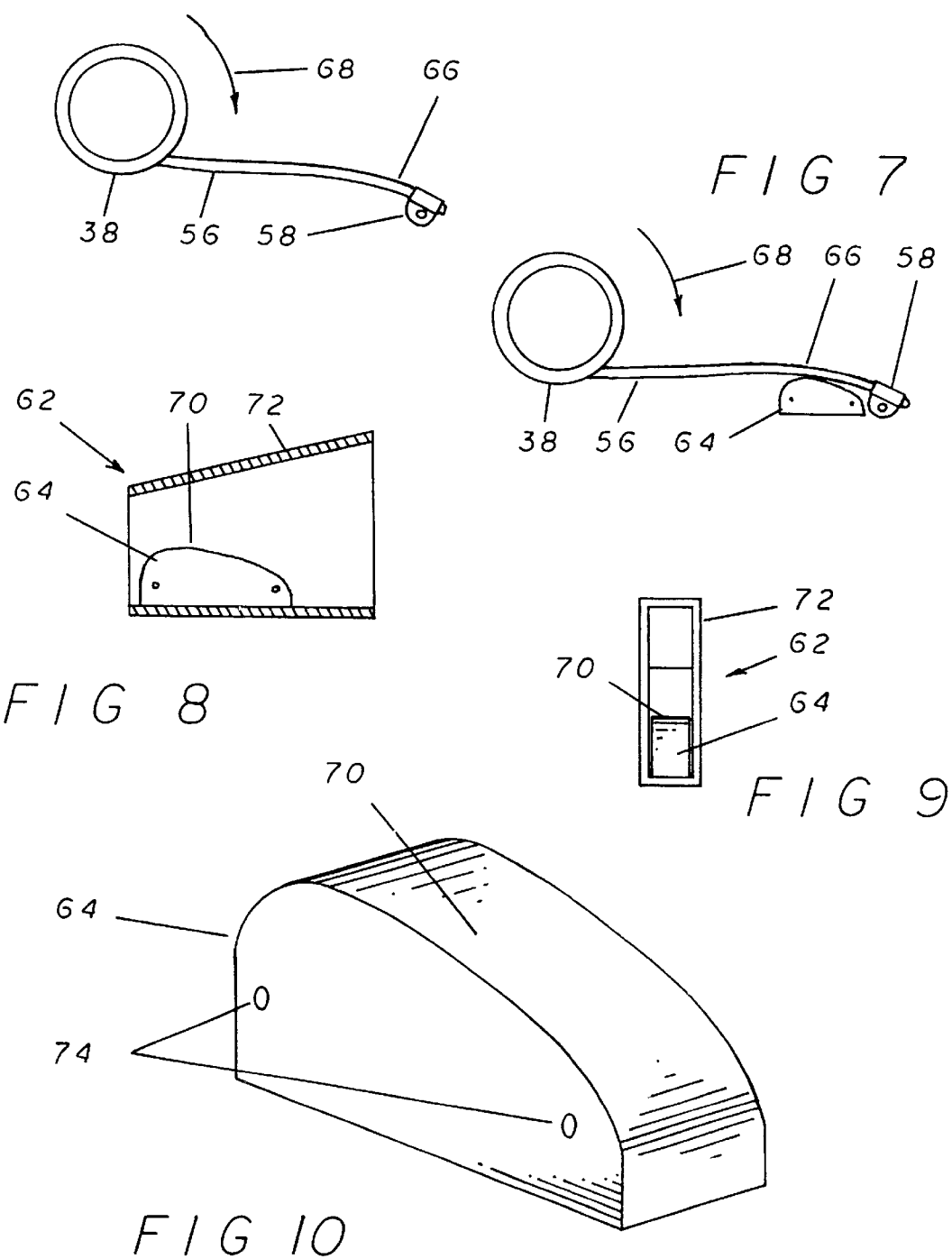

PROGRESSIVE RATE SUSPENSION SPRING TENSIONING DEVICE

BACKGROUND OF THE INVENTION

The present invention relates to an improvement in the manner in which the rear suspension of a typical snowmobile is constructed. More specifically, to a method of varying the vertical force that is necessary to compress the spring component of the rear suspension. This has the effect of stiffening the ride at the rear of the snowmobile which improves its handling and performance characteristics under certain riding conditions and is especially advantageous for use in snowmobiles that are used for racing.

It has long been known by motor sports enthusiasts that a key to improving the handling characteristics of any given vehicle that is to be used for racing or any other situation in which a premium is placed on performance is to increase the stiffness of its suspension components. The reason for this is that the stiffer suspension will flex less under a load which has the effect of keeping the suspended drive or steering components of the vehicle in contact with the surface over which the vehicle is traveling. A stiffer suspension also lessens the amount of roll (a horizontal change in attitude) of the body of the vehicle in relation to its drive and steering components as it is driven over rough terrain and through corners. A lesser amount of body roll allows an operator to travel faster through corners and over rough terrain because it keeps the weight of the vehicle's body and operator centered over its drive and steering components which provides more traction and steering impetus to the vehicle in these conditions. Therefore, as a general rule in high performance vehicles, the stiffer that the suspension can be set up, the faster the vehicle will be able to travel over a given set of course obstacles or configurations.

Problems also arise from a vehicle which is set up with a suspension that is too stiff. The first of these is that if the vehicle's suspension is too stiff the resulting roughness of the ride in difficult terrain will make it impossible for the driver to control the vehicle as he would be bounced around to such a degree that he would be unable to focus on the road or track ahead. Additionally, an extremely stiff suspension would also create problems in the drive and steering mechanisms of a vehicle as they would tend to bounce over surface irregularities and lose contact with the surface over which they are traveling. This loss of surface contact would make the vehicle very difficult to control and, thus, force the vehicle to be driven at a slower rate of speed in order to maintain control over it. Therefore, finding the proper balance between suspension stiffness and controllability is critical to the performance of all types of racing and high performance vehicles.

The stiffness and controllability of the rear suspension of a snowmobile is controlled by the use of a pair of coiled springs that have a spring arm which angles downward and are fixedly attached to a lower suspension component. It is the flexing of the spring arm which primarily facilitates and controls the vertical movement of the suspension as a whole as the snowmobile travels over uneven terrain. The problem with this design is that the only way the spring rate can be varied to either stiffen or soften the suspension to compensate for different terrain conditions is to change out the springs themselves. This is a very time consuming operation which requires that the entire rear suspension assembly be unassembled, resulting in a lot of down time. Therefore, it is desirable to provide a method of varying the stiffness of the rear suspension of a snowmobile without the need of replacing the suspension springs.

SUMMARY OF THE INVENTION

It is the primary objective of the present invention to provide a method of stiffening the rear suspension of a typical snowmobile that can be used in conjunction with the original components of the rear suspension.

It is an additional objective of the present invention to provide such a method of stiffening the rear suspension of a snowmobile that provides a greater degree of resistance corresponding to the occurrence of a higher degree of force being placed on the snowmobile.

It is still a further objective of the present invention to provide such a method of stiffening the rear suspension of a snowmobile that works equally effectively with a wide variety of makes and models and that is inexpensive to construct and to sell.

These objectives are accomplished by the use of a cambered surfaced tensioning block that engages the forward portion of the spring arm component of the rear suspension of a snowmobile when sufficient lateral force is applied to the suspension. The spring arms pass through an open ended block housing just above the upper surface of the tensioning block. The tensioning block fits within an open ended block housing which is attached to the slide rail components of the rear suspension in a position that is just rearward of the point at which the spring arms are attached.

The spring arm functions within the rear suspension by flexing downwards and upwards when lateral forces are applied to the snowmobile and serves to both contain these forces and to maintain the suspension in a neutral position during normal operation. This flexing of the spring arm generally occurs within the relatively short portion of the arm that is located directly behind the point of attachment to the slide rail components of the rear suspension. The positioning of the flex or load point of the spring arm creates a relatively soft spring action as the application of force to it is at the furthest possible point from the flex or load point.

The use of the present invention effectively moves the flex or load point of the spring arm rearward and closer to the point at which the force is applied. This is accomplished because as the spring arm begins to flex downward, it contacts the upper surface of the tensioning block which changes the load point from its original position to that at which it is in contact with the tensioning block. Additionally, the upper surface of the tensioning block is formed in a curve in a manner so that the radius of that curve lessens as you move rearward which creates a cambered surface. The cambered upper surface of the tensioning block is utilized to move the load point closer still to the point of force application as the lateral force applied to the suspension increases. Therefore, the use of the present invention provides a rear suspension spring characteristic that grows increasingly stiff as more and more lateral force is applied to it. This improves the handling of snowmobiles in rough terrain which is very desirable in high performance machines.

For a better understanding of the present invention reference should be made to the drawings and the description in which there are illustrated and described preferred embodiments of the present invention.

DESCRIPTION OF THE DRAWINGS

FIG. 2 is a side elevation view of the rear suspension of the prior art illustrating the orientation of its major components.

FIG. 3 is a top elevation view of the rear suspension of the prior art illustrating the orientation of its major components.

FIG. 6 is a side elevation view of the rear suspension spring component of the prior art illustrating the manner in which a downward force affects the spring arm.

FIG. 7 is a side elevation view of the present invention illustrating the manner in which it works to change the spring rate of the existing spring arm.

FIG. 8 is a side elevation cut-away view of the present invention showing the orientation of the spring block within the block housing.

FIG. 9 is a front elevation view of the present invention showing the orientation of the spring block within the block housing.

FIG. 10 is a perspective view of the spring block component of the present invention detailing its cambered upper surface.

DESCRIPTION OF THE PREFERRED EMBODIMENT

Figure 1:
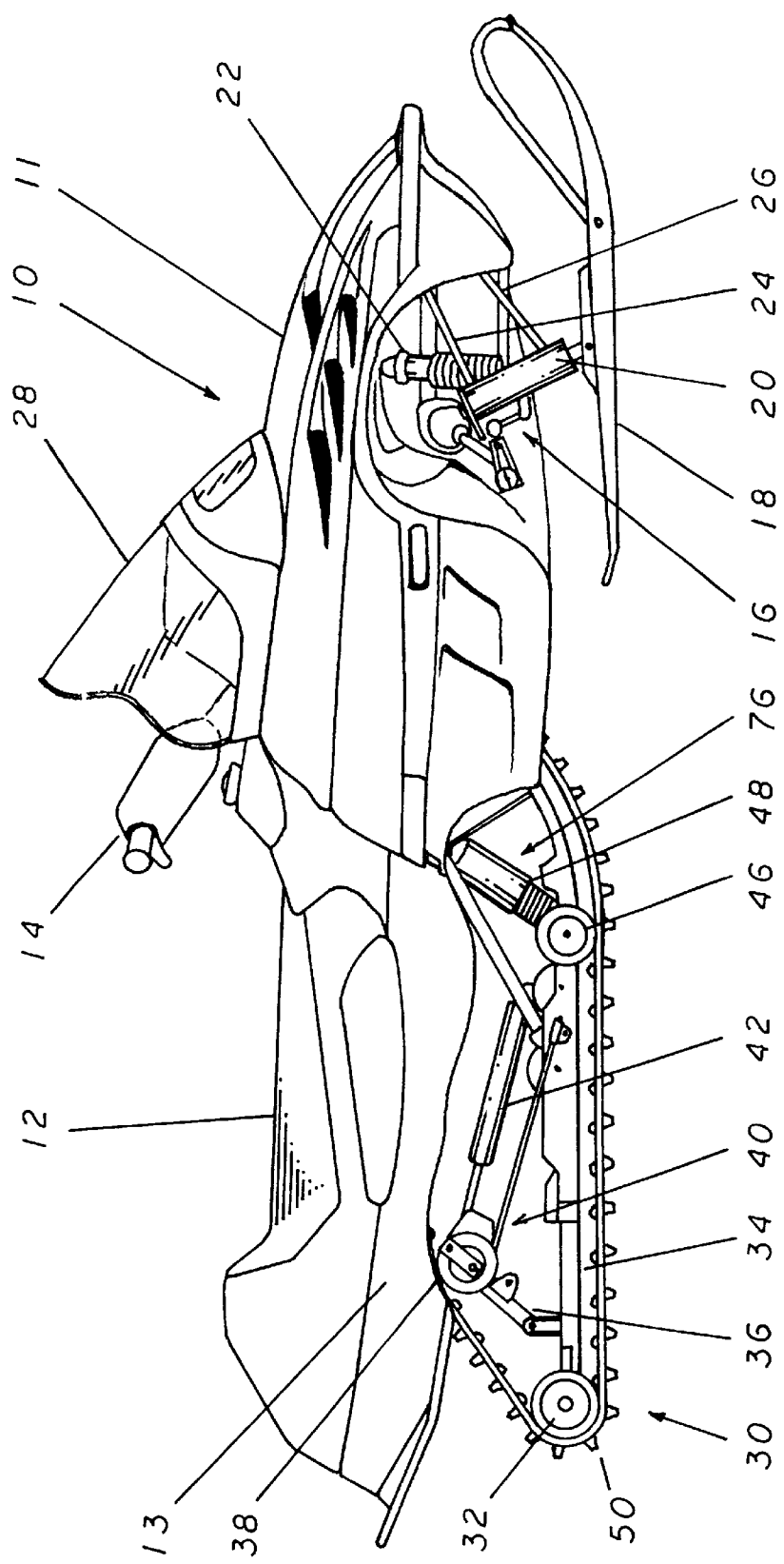
FIG. 1 is a side elevation view of a typical snowmobile with the rear suspension exposed illustrating the orientation of the spring components in relation to the whole of the existing prior art.

Referring now to the drawings, and more specifically to FIG. 1 which is an illustration of the prior art, a typical snowmobile 10 consists of a aerodynamically shaped fiberglass body 11 which is attached to a frame 13. The rear portion of the body 11 is equipped with a seat 12 which provides positioning for one or two people. The body 11 of the snowmobile 10 is also generally equipped with a transparent windscreen 28 which extends in an upward fashion and provides some protection from the wind as the snowmobile 10 moves forward over the snow. Located directly behind the windscreen 28 and in front of and above the seat 12 is the steering yolk 14 which is directly connected to the front suspension 16 of the snowmobile 10. It is the steering yolk 14 that the operator uses to control the forward direction of the snowmobile 10.

The front suspension 16 of the snowmobile 10 is primarily made up of a pair of skis 18 which are the components of the front suspension 16 which contact the snow and provide the directional imputes for the snowmobile 10. The skis 18 are pivotally connected at their upper center point to the suspension spindles 20. The suspension spindles 20 extend upwardly in a slightly rearward angle and are connected to the upper linkage 24 and the lower linkage 26 which allow the suspension spindles 20 to move up and down along with the skis 18 to compensate for irregularities encountered in the terrain as the snowmobile travels forward. This upward and downward movement is controlled by the use of the front shocks 22 which also contain the springs which hold the front suspension in the proper position in relation to the body 11 of the snowmobile 10.

The rear suspension 30 of a snowmobile 10, which is an example of the prior art, is detailed in FIGS. 1, 2, and 3. The rear suspension 30 components of a snowmobile 10 are all contained within the interior of the drive track 50 which is drive by the engine of the snowmobile 10 and provides the forward imputes for the vehicle. The rear suspension 30 of the snowmobile 10 allows the rear end to make adjustments for uneven terrain encountered during travel and is designed in a manner that ensures that the majority of the drive track 50 will remain in contact with the snow as the vehicle moves forward in all types of conditions.

The rear suspension 30 of a typical snowmobile 10 is primarily made up of a pair of slide rails 34 which extend from the most rearward portion of the drive track 50 to just rear of the most forward end of the track 50. The slide rails 34 form a solid support surface upon which the portion of the flexible drive track 50 runs that contacts the upper surface of the snow during wheel operation. For this purpose, approximately the most forward twenty five percent of slide rails 34 are upwardly curved to provide this support to the leading edge of the drive track 50 to ensure that this portion of the track is supported when encountering irregularities in the surface over which the snowmobile 10 is traveling.

The suspension slide rails 34 also are the components of the present invention to which the rest of the suspension parts are attached. Located at the most rearward end of the slide rails 34 and at the points that correspond to the outer edge of the drive track 50 are the rear idler wheels 32, The rear idler wheels 34 are the components of the present invention which contacts the inner surface of the drive track 50 and provide the point of rotation at which the reward direction of the lower surface of the drive track 50 is changed to the forward direction of travel of the drive track 50 at its upper surface. Thus, the rear idler wheels 32 function to guide the rotation of the drive track 50 around the most reward portion of the rear suspension 30 and also aid in maintaining the drive track 50 within the confines of the rear suspension 30.

Just forward of the rear idler wheels 32 along the upper surfaces of the slide rails 34 are located the rear arms 36 which extend upwards and are pivotal in nature. The rear arms 36 provide the mounting point for the raised idler wheels 38. The raised idler wheel's 38 primary function is very similar to that of the rear idler wheel's 36 in that they provide a point of directional change for the drive track 50 and help to maintain it in the proper orientation during vehicle operation. Additionally, the system of which the raised idler wheels 38 are a part also houses the rear suspension spring 40 which is the component of the rear suspension 30 which provides the adjustment capabilities that are necessary for the operation of a snowmobile 10 in uneven terrain.

The rear suspension spring 40 is mounted to the rear suspension 30 on the raised idler axle 60 which also provides at its outer ends the mounting point for the raised idler wheels 38. The rear suspension spring 40 consists of two suspension spring coils 54 which each fit over the opposite ends of the raised idler axle 60, just inside of the two raised idler wheels 38. Each of the spring coils 54 have a spring arm 56 that extends in a downward and forward manner (in relation to the snowmobile 10) and that attach to the slide rails 34 by means of the spring arm retainers 58. Thus, when a vertical force is exerted on the rear suspension 30, it is the rear suspension spring 40 which absorbs this force and this force is mostly absorbed through the flexing of the spring arm 56 at a point just above its connection with the spring arm retainer 58.

The raised idler axle 60 also serves as the point of attachment for the rear end of the rear arm shock 42. The rear arm shock 42 is attached to the rear suspension 30 at its front end at a point that is midway between the two slide rails and just rearward of the forward point of the slide rails 34 at which they begin to curve upwards as previously described. The rear arm shock 42 functions to dampen the movement of the rear suspension 30 as the rear suspension spring 40 operates to absorb vertical forces. The purpose of the dampening effect of the rear arm shock 42 is to control the vertical movement of the rear suspension 30 in order that the drive track 50 will maintain the highest possible degree of contact with the surface over which it is traveling.

The rear suspension 20 of a typical snowmobile 10 also contains a drive track tensioning apparatus 76, which purpose maintains the correct tension on the drive track 50 as the rear moves to adjust for irregularities in the terrain. The use of the track tensioning apparatus 76 is critical for the operation of the rear suspension 30 because as vertical forces are applied to it and as the rear suspension spring 40 compresses, the distance between the raised idler wheels 38, which control the orientation of the drive track 50 at their point of contact, and the lower surface of the drive track 50, is considerably shortened. If there was no way to compensate for this variance, the drive track 50 could easily become dislodged from its position on the rear suspension 30.

The track tensioning apparatus 76 compensates for this variability in the drive track 50 primarily through the use of a front arm shock 48. The front arm shock 48 is attached at its lower end to the slide rails 34 at a central point between the front idler wheels 46 (the form and function of which are similar to the other idler wheels discussed above). At its upper end, the front arm shock 48 is attached to the central portion of the guide axle 80 which holds at specific points along its length a plurality of front idler guides 78. The front idler guides 78 again function like the raised idler wheels 38 in that they hold the front portion of the drive track 50 in the proper orientation during vehicle operation by engaging its interior surface just above the front of the slide rails 34.

The tensional compensation function of the track tensioning apparatus 76 is primarily accomplished by the operation of the front arm shock 48. The front arm shock 48 contains a relatively large compression spring that operates to place upward pressure on the entire system. This upward pressure serves to ensure that the front idler guides 76 place pressure upon and remain in contact with the inner surface of the drive track 50 which keeps the drive track at the proper tension. The contact with the drive track 50 also acts to contain a certain amount of the compressed force within the spring, which ensures that there is always upward force on the interior surface of the drive track 50. Therefore, when the rear suspension spring 40 compresses due to a vertical force and the drive track 50 is loosened due to the change in position of the raised idler wheels 38, the track tensioning apparatus 76 maintains the proper tension on the drive track 50. This is done by forcing the front idler guides 78 in an upward fashion through the front arm shock 48 which pushes against the front portion of the drive track 50. It is this upward motion of the track tensioning apparatus 76 that compensates for any changes in the outer configuration of the track 50 due to the movement of the raised idler wheels 38 while the snowmobile 10 is in motion.

Figure 4:
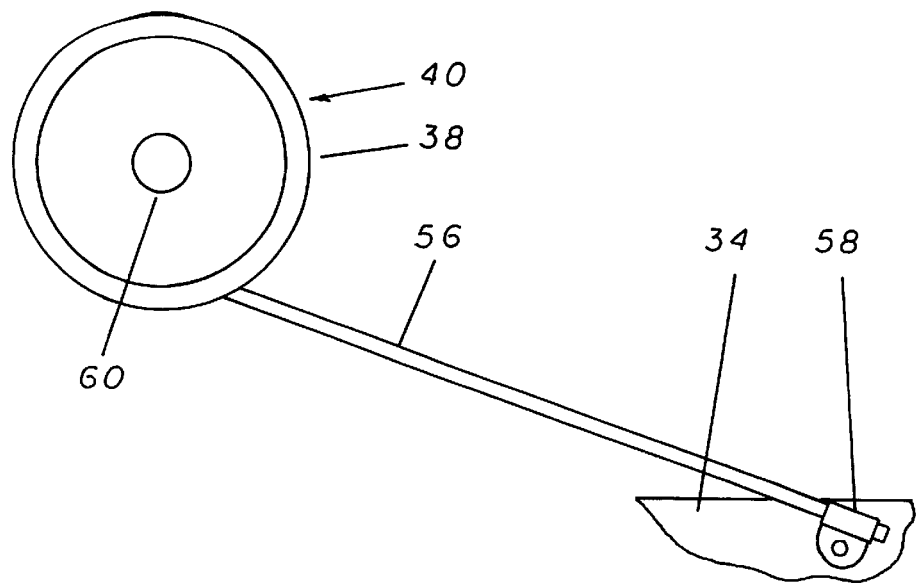
FIG. 4 is a side elevation view of the rear suspension spring component of the prior art.
Figure 5:
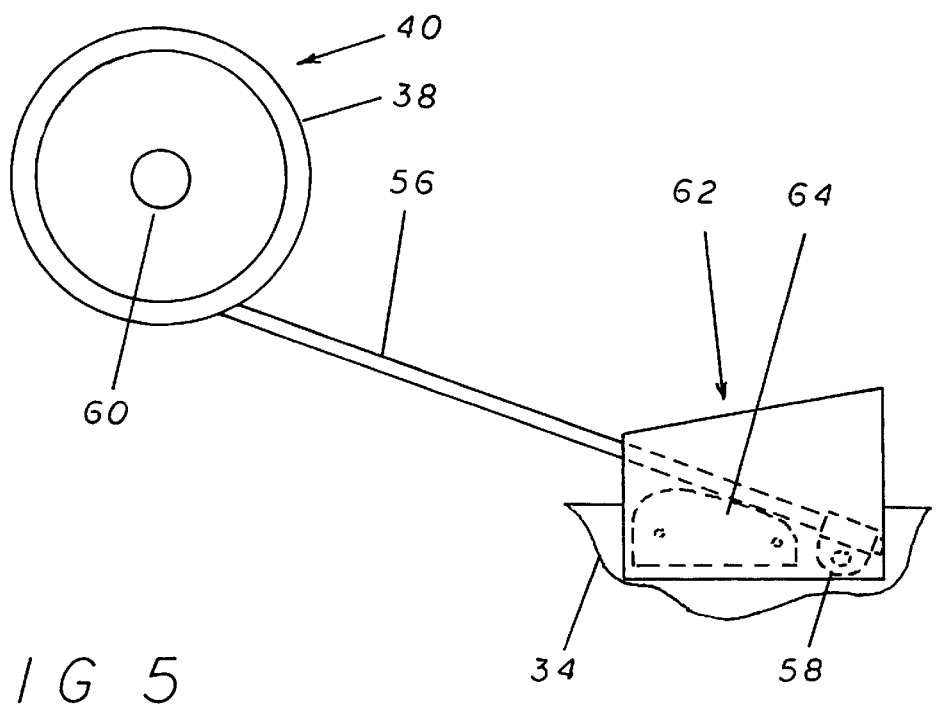
FIG. 5 is a side elevation view of the present invention detailing the manner in which it is used in conjunction with the prior art.

FIGS. 4 and 5 illustrate the method of construction of the rear suspension spring 50 in both the prior art (FIG. 4) and its configuration when used with the spring tensioning device 62 (FIG. 5). In the prior art, the rear suspension spring 40 is attached to the raised idler axle 60 inside of the raised idler wheel 38. From this configuration, the spring arm 56 component of the rear suspension spring 40 extends forward and downward to the point at which it is attached to the slide rail 34 by means of the spring arm retainer 58. The attachment of the spring arm retainer 58 to the slide rail 34 is accomplished in a manner so that it is held in a fixed position. This means that any change in attitude in the rear suspension spring 40 in relation to the slide rail and spring arm retainer 58 is compensated for in the length of the spring arm 56 and not by the spring arm retainer 58.

With the use of the spring tensioning device 62 in conjunction with the rear suspension spring 40, the basic configuration of the rear suspension spring 40 is the same as with the prior art with the exception that the present invention is attached to the slide rail 34 through the use of the block housing 72 in a position so that it can interact with the spring arm 56. This interaction with the spring arm 56 is the pivotal point of the invention as the placement of the tensioning block 64 serves to limit the travel of the spring arm 56 as the rear suspension spring 40 changes its orientation in relation to the slide rail 34 in response to terrain anomalies encountered by the moving snowmobile 10.

The manner in which the tensioning block 64 changes the action of the spring arm is illustrated in FIG. 6 (which shows the action of the spring arm 56 in the prior art without the use of the present invention) and in FIG. 7 (which shows the action of the spring arm 56 with the use of the present invention). As a vertical force is placed on the rear suspension 30 of a snowmobile 10 it causes a spring compression motion as indicated by the arrow labeled as 68. This action causes the spring arm to load at a specific point which is illustrated in both FIGS. 6 and 7.

Without the use of the present invention, the load point 66 is relatively close to the point at which the spring arm 56 is joined to the spring arm retainer 58. This creates a relatively soft spring arm 56 as the point of origin of the spring load 68 is comparatively a long distance from the point at which the spring arm retainer 58 is fixedly attached. This configuration creates a long lever which requires a relatively small amount of force to flex the load point 66 of the spring arm 56 which in turn creates a rear suspension 30 with a softer feel and, thus, a snowmobile 10 with a soft ride quality.

Conversely, when the present invention is used with a spring arm 56 and spring arm retainer 58, it effectively moves the load point of the spring arm closer to the point of origin of the spring load 68. This creates a relatively hard or stiff spring arm 56 as the point of origin of the spring load 68 is comparatively a short distance from the point at which the spring arm retainer 58 is fixedly attached. This configuration creates a short lever which requires a relatively large amount of force to flex the load point 66 of the spring arm 56 which in turn creates a rear suspension 30 with a harder or stiffer feel and, thus, a snowmobile 10 with a hard ride quality. The advantage of a snowmobile 10 which has a stiffer rear suspension 30 is that it will be more responsive and provide a greater degree of operator control which is especially desirable in high performance machines.

The manner of construction of the present invention is further illustrated in FIGS. 8, 9, and 10. The spring tensioning device 62 consists primarily of a tensioning block 64 which is located within the block housing 72 and attached therein by the use of the two attachment holes that are drilled through its side surfaces. This entire configuration is mounted to the rear suspension 30 of a snowmobile 10 in a location so that the spring arm 56 passes through the open ended block housing 72 just above the tensioning block 64.

This manner of construction allows the rear suspension to operate normally until enough lateral force has been applied for the spring arm to engage the tensioning block 64.

The tensioning block contains an upper cambered tensioning surface 70 which is the portion of the invention that is used to engage the spring arm 56 of the rear suspension 30. The cambered surface of the tensioning block 64 allows the spring arm 56 to contact it in a variety of different places that progress further away from the point of attachment at the spring arm retainer 58 depending upon the amount of lateral force that is placed on the rear suspension 30. Thus, as the amount of lateral force applied to the spring arm 56 is increased, the load point 66 moves closer to the point of origin for the spring load 68 which has the effect of progressively stiffening the rear suspension 30. Effectively, this means that the rougher and more demanding the terrain over which the snowmobile 10 is being driven, the stiffer the rear suspension will be and, therefore, the more control the operator will have.

Figure 11:
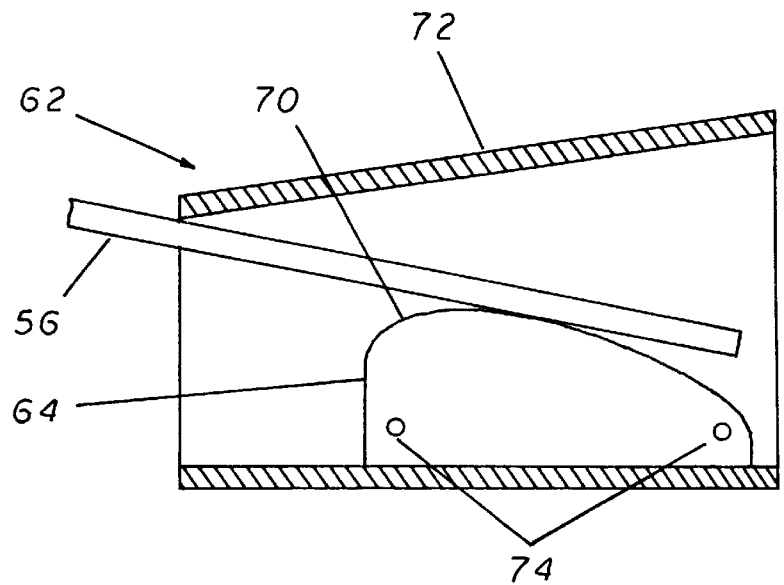
FIG. 11 is a side elevation cut-away view of an alternative embodiment of the present invention showing the orientation of the spring block within the block housing when the spring arm retainer is not employed.
Figure 12:
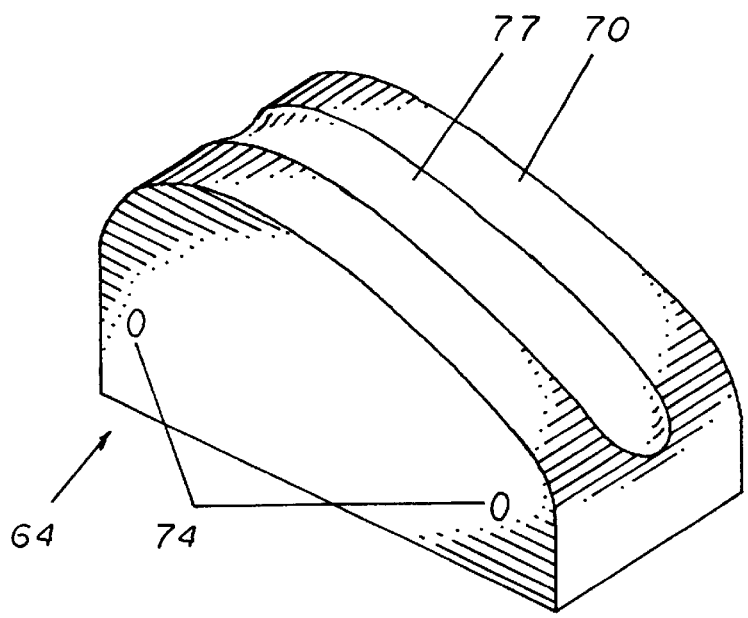
FIG. 12 is a perspective view of an alternative embodiment of the spring block component of the present invention in which a spring arm groove is formed into the cambered upper surface of the spring block.

Additionally, two further alternative embodiments of the present invention are illustrated in FIGS. 11 and 12. FIG. 11 illustrates an alternative embodiment of the spring tensioning device 62 of the present invention in which the spring arm retainer 58 of the previous embodiment has been removed and the most forward portion of the spring arm 56 is left unfixed. In this embodiment, the downward tension placed on the spring arm 56 supplies enough force to keep the spring arm 56 in contact with the tensioning surface 70 of the tensioning block 64 during all phases of the operation of the invention. Also, the tensioning block 64 in this embodiment has been moved forward, in relation to the vehicle as a whole, within the block housing 72. This design feature serves to further alter the loading characteristic of the spring arm 56, which also enhances the handling characteristics of the vehicle with which the invention is used.

Finally, FIG. 12 illustrates an alternative embodiment of the tensioning block 64 component of the present invention. In this embodiment, the upper tensioning surface 70 is equipped with a shallow concave spring arm retainer groove 77 which extends along the length of the upper tensioning surface 70 and matches the outside diameter of the spring arm 56 in form and size. The purpose of the spring arm retainer groove 77 is to hold the spring arm 56 in the proper orientation along the upper tensioning surface 70 and it is especially useful when used in conjunction with the previously described embodiment in which the spring arm retainer 58 has been removed.

Although the present invention has been described in considerable detail with reference to certain preferred versions thereof, other versions are possible. Therefore, the spirit and scope of the appended claims should not be limited to the description of the preferred versions contained herein.

What is claimed is:

1. A progressive rate spring tensioning device mounted to a vehicle having a body and a chassis supported within said body, comprising:

a suspension spring attached to said body;

an arm extending outwardly from said suspension spring, wherein said arm is attached to said chassis; and a cam block having an upper surface, wherein said upper surface allows said arm to contact said cam block in varying locations depending upon an amount of compression upon said spring;

wherein said arm passes through an open end of a housing wherein said cam block is positioned within said housing.

2. The progressive rate spring tensioning device of claim 1, wherein said upper surface of said block is curved.

3. The progressive rate spring tensioning device of claim 1, including a groove within said upper surface of said cam block for receiving said arm.

4. The progressive rate spring tensioning device of claim 1, wherein a distal portion of said arm is attached to said chassis.

5. The progressive rate spring tensioning device of claim 1, wherein said vehicle is a track driven snowmobile.

6. The progressive rate spring tensioning device of claim 1, wherein said housing has a slanted upper ceiling.

7. The progressive rate spring tensioning device of claim 1, wherein said cam block is secured to said chassis by at least one fastener.

8. The progressive rate spring tensioning device of claim 1, wherein said upper surface of said block is slanted.

9. The progressive rate spring tensioning device of claim 1, wherein said upper surface of said block is formed to engage an inner portion of said arm at a higher elevation than a distal portion of said arm.

10. A progressive rate spring tensioning device mounted to a vehicle having a body and a chassis supported within said body, comprising:

a suspension spring attached to said body;

an arm extending outwardly from said suspension spring, wherein a distal end of said arm is attached to said chassis at a secured point; and a cam block having an upper surface attached to said chassis between said secured point and said suspension spring, wherein said upper surface allows said arm to contact said cam block in varying locations depending upon an amount of compression upon said spring, wherein said arm passes through an open end of a housing at least partially surrounding said cam block.

11. The progressive rate spring tensioning device of claim 10, wherein said upper surface of said block is curved.

12. The progressive rate spring tensioning device of claim 10, including a groove within said upper surface of said cam block for receiving said arm.

13. The progressive rate spring tensioning device of claim 10, wherein a distal portion of said arm is attached to said chassis.

14. The progressive rate spring tensioning device of claim 10, wherein said vehicle is a track driven snowmobile.

15. The progressive rate spring tensioning device of claim 10, wherein said upper surface of said block is slanted.

16. The progressive rate spring tensioning device of claim 10, wherein said upper surface of said block is formed to engage an inner portion of said arm at a higher elevation than a distal portion of said arm.

* * * * *

UNITED STATES PATENT AND TRADEMARK OFFICE
CERTIFICATE OF CORRECTION

PATENT NO.      : 6,354,391 B1
DATED           : May 17, 2002
INVENTOR(S)     : Dale DeWayne Cormican It is certified that error appears in the above-identified patent and that said Letters Patent is hereby corrected as shown below:

<u>Column 5,</u>
Line 14, after "The rear suspension" please replace "20" with -- 30 --

Signed and Sealed this

Seventeenth Day of September, 2002

Attest:

Attesting Officer

JAMES E. ROGAN
Director of the United States Patent and Trademark Office